(12) United States Patent
Bortolotto et al.

(10) Patent No.: US 7,035,204 B1
(45) Date of Patent: Apr. 25, 2006

(54) METHOD AND APPARATUS FOR REROUTING TELECOMMUNICATIONS SIGNALS

(75) Inventors: Robert L. Bortolotto, Santa Rosa, CA (US); Steven H. Goody, Santa Rosa, CA (US); David A. Hillard, Novato, CA (US); Carmel Chi Him Lau, Petaluma, CA (US); Daniel Scott Terhune, Santa Rosa, CA (US); Michael F. Davis, Penngrove, CA (US); Xiao Pin Nie, Petaluma, CA (US)

(73) Assignee: Cicso Technology, Inc., San Jose, CA (US)

( * ) Notice: Subject to any disclaimer, the term of this patent is extended or adjusted under 35 U.S.C. 154(b) by 1247 days.

(21) Appl. No.: 09/625,663

(22) Filed: Jul. 26, 2000

(51) Int. Cl.
*H04L 12/26* (2006.01)

(52) U.S. Cl. .................. 370/218; 370/248; 370/250

(58) Field of Classification Search ........ 370/216–218, 370/404, 405, 406, 222–224, 242, 248, 250, 370/389, 390, 401
See application file for complete search history.

(56) References Cited

U.S. PATENT DOCUMENTS

| | | | |
|---|---|---|---|
| 4,376,998 A | 3/1983 | Abbott et al. .............. 370/225 |
| 4,888,586 A | 12/1989 | Ise et al. .................... 370/221 |
| 4,967,405 A | 10/1990 | Upp et al. ...................... 370/1 |
| 4,998,242 A | 3/1991 | Upp ............................. 370/60 |
| 5,040,170 A | 8/1991 | Upp et al. ................. 359/135 |
| 5,161,152 A | 11/1992 | Czerwiec et al. .......... 370/463 |
| 5,185,736 A | 2/1993 | Tyrrell et al. ............... 370/509 |
| 5,189,410 A | 2/1993 | Kosugi et al. ........... 340/825.2 |
| 5,315,594 A | 5/1994 | Noser .......................... 370/353 |
| 5,329,520 A | 7/1994 | Richardson ................. 370/225 |
| 5,343,194 A | 8/1994 | Bowden .................... 340/2.22 |
| 5,436,890 A | 7/1995 | Read et al. ................. 370/352 |
| 5,497,363 A | 3/1996 | Gingell ....................... 370/466 |
| 5,737,320 A | 4/1998 | Madonna .................... 370/258 |
| 5,740,157 A | 4/1998 | Demiray et al. ............ 370/219 |
| 5,771,274 A | 6/1998 | Harris ....................... 379/22.03 |
| 5,790,519 A | 8/1998 | Hanson et al. .............. 370/220 |
| 5,841,760 A | 11/1998 | Martin et al. ............... 370/242 |
| 5,848,065 A | 12/1998 | Gorshe et al. .............. 370/539 |
| 5,872,780 A | 2/1999 | Demiray et al. ............ 370/359 |
| 5,901,136 A | 5/1999 | Lovelace et al. ........... 370/217 |

(Continued)

OTHER PUBLICATIONS

Technical Note, The Fundamentals of SONET, Telecommunications Techniques Corporation, pp. 1-28, Nov. 1994.

(Continued)

*Primary Examiner*—Chau Nguyen
*Assistant Examiner*—Soon D. Hyun
(74) *Attorney, Agent, or Firm*—Aka Chan LLP

(57) ABSTRACT

The present invention discloses a method and apparatus for rerouting high-speed telecommunications signals within a network element (NE). Data circuits are defined as the interface cards within the NE that receive a particular data stream. In the event that one or more of the interface cards associated with a particular data circuit is removed, the NE can reroute the data stream so that the data circuit is maintained. The rerouting is accomplished by creating a stitching table, which defines the previous stitch and next stitch for each port on a cross-connect unit. Thus, when one stitch is lost, the table enables the apparatus to reroute the data stream around the lost stitch. That is, the data circuit is stitched together when one or more elements of the data circuit are removed.

52 Claims, 10 Drawing Sheets

U.S. PATENT DOCUMENTS

| | | | |
|---|---|---|---|
| 6,038,212 A * | 3/2000 | Galand et al. | 370/216 |
| 6,038,288 A | 3/2000 | Thomas et al. | 379/15 |
| 6,092,214 A | 7/2000 | Quoc et al. | 714/4 |
| 6,160,806 A | 12/2000 | Cantwell et al. | 370/466 |
| 6,188,686 B1 | 2/2001 | Smith | 370/388 |
| 6,359,859 B1 * | 3/2002 | Brolin et al. | 370/218 |
| 6,392,989 B1 * | 5/2002 | Jardetzky et al. | 370/216 |
| 6,414,953 B1 | 7/2002 | Lamarche et al. | 370/359 |
| 6,424,629 B1 | 7/2002 | Rubino et al. | 370/241.1 |
| 6,424,649 B1 | 7/2002 | Laor et al. | 370/359 |
| 6,580,720 B1 * | 6/2003 | Francis et al. | 370/423 |
| 6,587,470 B1 | 7/2003 | Elliot et al. | 370/404 |

OTHER PUBLICATIONS

Ching et al, SONET Implementation, IEEE, pp. 34-40, Sep. 1993.

DeWilde et al, Integrated Switch and Cross-Connect Systems as a Flexible Transport Network, IEEE, pp. 675-678, Mar. 1988.

* cited by examiner

METHOD AND APPARATUS FOR REROUTING TELECOMMUNICATIONS SIGNALS

BACKGROUND OF THE INVENTION

Telecommunications systems are carrying increasing amounts of information, both in long distance networks as well as in metropolitan and local area networks. At present, data traffic is growing much faster than voice traffic, and includes high bandwidth video signals. In addition to the requirement for equipment to carry increasing amounts of telecommunication traffic there is a need to bring this information from the long distance networks to businesses and to locations where it can be distributed to residences over access networks.

The equipment, which has been developed to carry large amounts of telecommunication traffic, includes fiber optic transport equipment that can carry high-speed telecommunication traffic. The data rates on fiber optic systems can range from millions of bits per second (Mb/s) to billions of bits per second (Gb/s). In addition, multiple wavelengths of light can be carried on an optical fiber using Wavelength Division Multiplexing (WDM) techniques.

The ability to carry large amounts of telecommunication traffic on an optical fiber solves the long-distance point-to-point transport problem, but does not address the issue of how to add and remove traffic from the high-speed data stream. Equipment for adding and removing traffic has been developed and is referred to as "add-drop" multiplexers (ADMs).

Traditional designs for ADMs are based on the use of multiple interface cards which receive high-speed data streams, create a time division multiplex signal containing the multiple data streams, and route the time division multiplex signal to a cross-connect unit which can disassemble the data streams, remove or insert particular data streams, and send the signal to another interface card for transmission back into the networks. By aggregating the multiple data streams into a time division multiplexed data signal, the data rate of the time division multiplexed signal is by definition several times the rate of the maximum data rate supported by the interface cards. Traditional ADMs have proven adequate for interface data rates in the range of 155 Mb/s to 622 Mb/s.

However, optical signals of at least 2.4 Gb/s have become standard, and numerous problems arise with traditional ADMs due to the timing associated with the multiplexing and transmission of the high-speed signals between the interface cards and the cross-connect unit. Thus, there is a need for cross-connect equipment which can support multiple high-speed data streams (i.e., at least 2.4 Gb/s).

Standardized interfaces and transmission hierarchies for telecommunication signals have been developed and include Pleisochronous Digital Hierarchy (PDH), Synchronous Digital Hierarchy (SDH) standards, and Synchronous Optical Network (SONET). In addition to these telecommunication transport standards, standards have been developed for interconnecting businesses and computers within businesses. These Metropolitan and Local Area Network (MAN/LAN) standards include Ethernet, Gigabit Ethernet, Frame Relay, and Fiber Distributed Data Interface (FDDI). Other standards, such as Integrated Services Digital Network (ISDN) and Asynchronous Transfer Mode (ATM) have been developed for use at both levels.

Individual pieces of equipment can be purchased to support telecommunication or MAN/LAN standards. However, these devices generally either connect data streams using a single protocol or convert entire data streams from one protocol to another. Thus, there is a need for a device that can establish interconnectivity between interfaces at the MAN/LAN level, while providing cross-connection to interfaces at the telecommunication network level.

Multiple interfaces are presently supported in ADMs using different interface cards. High-speed interface cards must be inserted into particular slots in order to insure that the high-speed signals can be transported to and from the cross-connect unit and to and from the high-speed interface cards. It would be desirable to have a device in which all cards can support high-speed optical signals of at least 2.4 Gb/s, regardless of the card slot they are located in. Moreover, it would also be useful to have a device that would support routing, bridging, and concentration functions within MANs/LANs, as well as permitting access to telecommunication networks.

A data circuit is defined as all of the interface cards within a particular ADM that a particular data stream is transmitted to. If a particular interface card becomes inoperable, for example is removed, the data circuit becomes open. That is, the inoperable interface card prevents the data stream from being delivered to any interface card after the inoperable card. Thus, there is a need for a device that can reroute data streams within the data circuit when one or more of the interface cards forming the data circuit becomes inoperable.

For the foregoing reasons, there is a need for a flexible cross-connect apparatus that includes a data plane and can support multiple high-speed optical interfaces in any card slot. Furthermore, the flexible cross-connect apparatus should establish connectivity between data cards and the telecommunication networks. Moreover, the flexible cross-connect apparatus should be able to maintain a data circuit by rerouting data streams when one or more interface cards within the circuit becomes inoperable.

SUMMARY OF THE INVENTION

The present invention discloses a method and apparatus for rerouting high-speed telecommunications signals within a network element (NE). Data circuits are defined as the interface cards within the NE that receive a particular data stream. In the event that one or more of the interface cards associated with a particular data circuit is removed, the NE can reroute the data stream so that the data circuit is maintained. The rerouting is accomplished by creating a stitching table, which defines the previous stitch and next stitch for each port on a cross-connect unit. Thus, when one stitch is lost, the table enables the apparatus to reroute the data stream around the lost stitch. That is, the data circuit is stitched together when one or more elements of the data circuit is removed.

According to one embodiment, an apparatus for maintaining a data circuit in the event that one or more devices within the data circuit become inoperable is disclosed. The apparatus includes a plurality of interface cards for transmitting and receiving data streams. A cross-connect unit routes the data streams received from a first set of the plurality of interface cards to a second set of the plurality of interface cards. The cross-connect unit routes each data stream based on an associated matrix, wherein the associated matrix identifies the interface cards that will receive the data stream and an order that the interface cards will receive the data stream. A control unit controls the operation of the apparatus. A backplane forms connections between the cross-connect unit and each of the plurality of interface cards.

According to one embodiment, an apparatus for flexibly routing a data stream around an inoperable interface card is disclosed. The apparatus includes a plurality of interface cards for transmitting and receiving data streams, wherein each interface card within a set of interface cards are receiving the data stream. The set of interface cards defines a data circuit. A cross-connect unit routes data streams between the plurality of interface cards. A control unit controls the operation of the apparatus. A backplane connects the plurality of interface cards to the cross-connect unit. A database contains a matrix for the data circuit that identifies the order that the data stream will be routed to the set of interface cards. For each interface card the matrix includes a destination point and a next destination point. The cross-connect unit utilizes the matrix to determine how to route the data stream and automatically routes the data stream to the next destination point when an interface card associated with the destination point becomes inoperable.

According to one embodiment, an apparatus for flexibly routing a data stream directly from a first interface card to a third interface card, when a second interface card that was supposed to receive the data stream from the first interface card and transmit the data stream to the third interface card becomes inoperable is disclosed. The apparatus includes a plurality of interface cards for transmitting and receiving data streams. A cross-connect unit routes data streams between the plurality of interface cards. A control unit controls the operation of the apparatus. A backplane connects the plurality of interface cards to the cross-connect unit. A database contains a matrix that directs where said cross-connect unit routes the data stream. The matrix includes a first destination and a second destination for each interface card, so that when the second interface card fails, the matrix directs the cross-connect unit to route the data stream from the first interface card to the third interface card.

According to one embodiment, a method for maintaining a data circuit in the event that one or more devices within the data circuit become inoperable is disclosed. The method includes defining the data circuit as a plurality of interface cards that will receive a particular data stream; generating a matrix based on the data circuit, the matrix including a destination point and a next destination point for each interface card; and routing the data stream to the appropriate interface cards, wherein a cross-connect unit routes the data stream to the destination point identified in the matrix, and if the interface card associated with the destination point is inoperable to the next destination point identified in the matrix.

According to one embodiment, a method for flexibly routing a data stream around an inoperable interface card is disclosed. The method includes defining a data circuit as a plurality of interface cards receiving the data stream; utilizing a cross-connect unit to route the data stream between the plurality of interface cards; and controlling the operation of the cross-connect unit with a matrix, the matrix identifying the order that the data stream will be routed to the data circuit including a destination point and a next destination point for each interface card so that the cross-connect unit automatically routes the data stream to the next destination point when an interface card associated with the destination point becomes inoperable.

According to one embodiment, a method for flexibly transmitting a data stream directly from a first interface card to a third interface card when a second interface card which was planned to receive the data stream from the first interface card and transmit the data stream to the third interface card is rendered inoperable is disclosed. The method includes generating a matrix that identifies interface cards to receive the data stream, the matrix including destination points and next destination points for each interface card; receiving the data stream at the first interface card; transmitting the data stream from the first interface card to a cross-connect unit; determining from the matrix that the cross-connect unit should route the data stream to the second interface card; determining that the second interface card is inoperable; determining from the matrix that the cross-connect unit should route the data stream to the third interface card; and transmitting the data stream from the cross-connect unit to the third interface card.

According to one embodiment, a computer program embodied on a computer readable memory for maintaining a data circuit in the event that one or more devices within the data circuit become inoperable is disclosed. The computer program includes a code segment for defining the data circuit as a plurality of interface cards that will receive a particular data stream; a code segment for generating a matrix based on the data circuit, the matrix including a destination point and a next destination point for each interface card; and a code segment for routing the data stream to the appropriate interface cards, wherein the data stream is routed to the destination point identified in the matrix, and if the interface card associated with the destination point is inoperable the data stream is routed to the next destination point identified in the matrix.

According to one embodiment, a computer program embodied on a computer readable memory for flexibly routing a data stream around an inoperable interface card is disclosed. The computer program includes a code segment for defining a data circuit as a plurality of interface cards receiving the data stream; a code segment for utilizing a cross-connect unit to route the data stream between the plurality of interface cards; a code segment for controlling the operation of the cross-connect unit with a matrix, the matrix identifying the order that the data stream will be routed to the data circuit including a destination point and a next destination point for each interface card so that the cross-connect unit automatically routes the data stream to the next destination point when an interface card associated with the destination point becomes inoperable.

According to one embodiment, a computer program embodied on a computer readable memory for flexibly transmitting a data stream directly from a first interface card to a third interface card when a second interface card which was planned to receive the data stream from the first interface card and transmit the data stream to the third interface card is rendered inoperable is disclosed. The computer program includes a code segment for generating a matrix that identifies interface cards to receive the data stream, the matrix including destination points and next destination points for each interface card; a code segment for receiving the data stream at the first interface card; a code segment for transmitting the data stream from the first interface card to a cross-connect unit; a code segment for determining from the matrix that the cross-connect unit should route the data stream to the second interface card; a code segment for determining that the second interface card is inoperable; a code segment for determining from the matrix that the cross-connect unit should route the data stream to the third interface card; and a code segment for transmitting the data stream from the cross-connect unit to the third interface card.

According to one embodiment, an Ethernet switch capable of re-routing a data stream if an Ethernet card within the Ethernet switch becomes inoperable is disclosed. The Ethernet switch includes a plurality of Ethernet cards for transmitting and receiving data streams. A cross-connect unit routes the data streams between said plurality of Ethernet cards. Memory contains a stitching matrix for each port on said cross-connect unit, wherein the stitching matrix identifies a next location to transmit the data stream in the event that a receiving Ethernet card is rendered inoperable.

According to one embodiment, a method of seamlessly maintaining connectivity between interface cards forming a data circuit, when one or more of the interface cards is disconnected from a cross-connect is disclosed. The method includes defining a circuit mapping table which includes information relating to how said interface cards are connected together through the cross-connect. The method detects when one or more of said interface cards is disconnected from the cross-connect. The remaining interface cards are connected together through the cross-connect, the connections between the remaining interface cards based on information contained in the circuit table.

According to one embodiment, a computer program embodied on a computer readable medium for seamlessly maintaining connectivity between remaining interface cards, when one or more of said interface cards is disconnected from the cross-connect unit is disclosed. The computer program includes a source code segment for defining a circuit mapping table which includes information relating to how said interface cards are connected together through the cross-connect; a source code segment for detecting when one or more of said interface cards is disconnected from the cross-connect; and a source code segment for connecting the remaining interface cards together through the cross-connect, the connections between the remaining interface cards based on information contained in the circuit table.

According to one embodiment, a method of establishing a virtual intelligent backplane is disclosed. The method includes connecting a plurality of interface cards to each other through a cross-connect, wherein the manner in which the interface cards are connected defines a data circuit. A mapping table is established for the data circuit, the mapping table including direct connections for each interface card and next connections for each interface card. A determination that a first interface card that is connected to a second interface card and a third interface card is inoperable is made. The second interface card is then connected to the third interface card, when the mapping table defines the third interface card as the next connection for the second interface card.

According to one embodiment, a computer program embodied on a computer readable medium for establishing a virtual intelligent backplane is disclosed. The computer program includes a source code segment for connecting a plurality of interface cards to each other through a cross-connect, wherein the manner in which the interface cards are connected defines a data circuit; a source code segment for establishing a mapping table for the data circuit, the mapping table including direct connections for each interface card and next connections for each interface card; a source code segment for determining that a first interface card that is connected to a second interface card and a third interface card is inoperable; and a source code segment for connecting the second interface card to the third interface card, when the mapping table defines the third interface card as the next connection for the second interface card.

These and other features and objects of the invention will be more fully understood from the following detailed description of the preferred embodiments, which should be read in light of the accompanying drawings.

BRIEF DESCRIPTION OF THE DRAWINGS

The accompanying drawings, which are incorporated in and form a part of the specification, illustrate the embodiments of the present invention and, together with the description serve to explain the principles of the invention.

In the drawings.

DETAILED DESCRIPTION OF THE PREFERRED EMBODIMENTS

Figure 1:
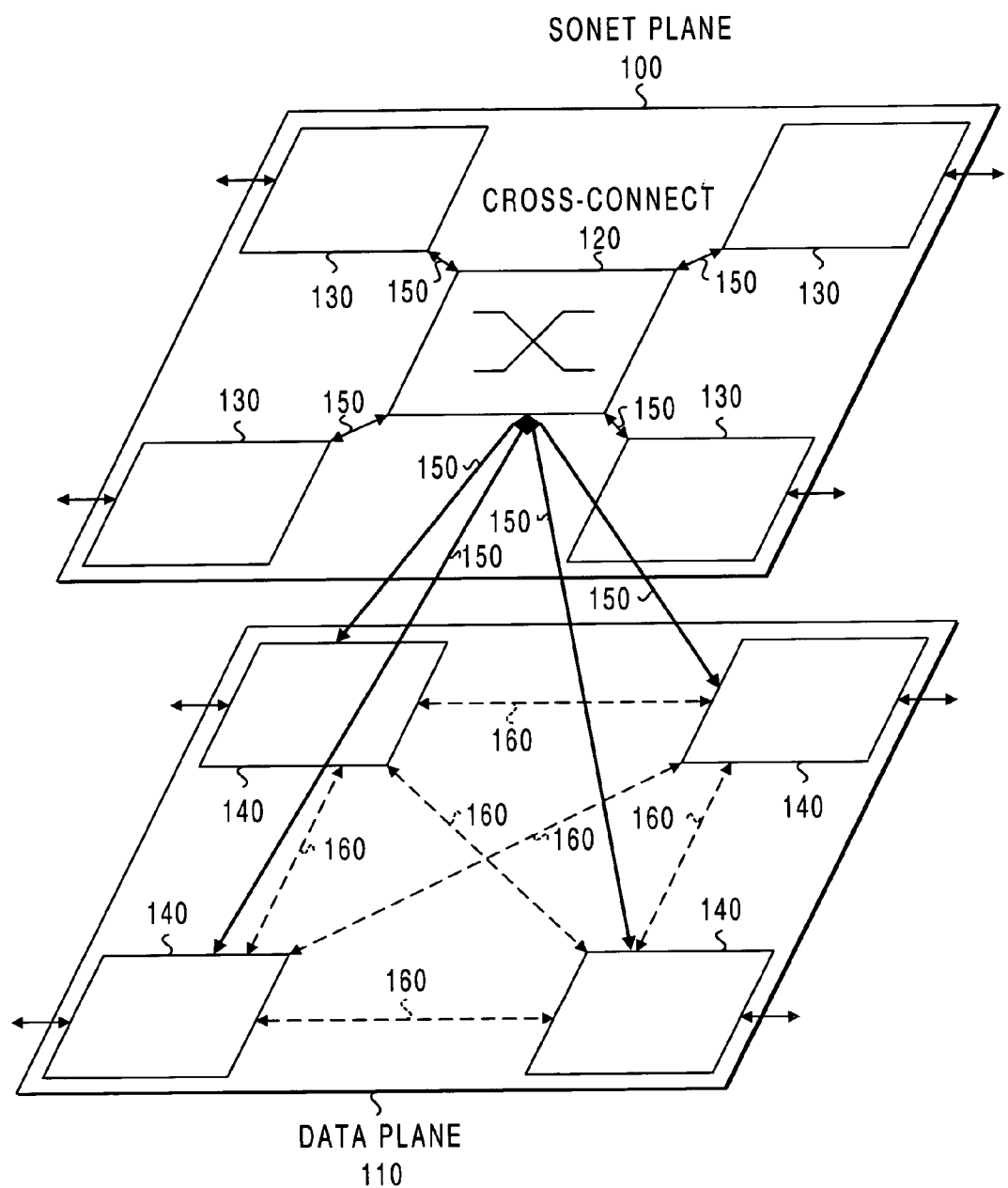
FIG. 1 illustrates a block diagram of the flexible cross-connect system, according to one embodiment.

In describing a preferred embodiment of the invention illustrated in the drawings, specific terminology will be used for the sake of clarity. However, the invention is not intended to be limited to the specific terms so selected, and it is to be understood that each specific term includes all technical equivalents that operate in a similar manner to accomplish a similar purpose.

With reference to the drawings, in general, and FIGS. 1 through 7 in particular, the apparatus and method of the present invention are disclosed.

Flexible cross-connect systems support numerous telecommunications and networking standards, including the following that are incorporated herein by reference:

Bellcore Standard GR-253 CORE, Synchronous Optical Network (SONET) Transport Systems: Common Generic Criteria, Issue 2, December 1995;

Bellcore Standard GR-1400 CORE, SONET Uni-directional Line-Switched Ring Equipment Generic Criteria;

Bellcore Standard GR-1230 CORE, SONET Bi-directional Line-Switched Ring Equipment Generic Criteria, Issue 3A, December 1996;

Bellcore TR-NWT-000496, SONET Add-Drop Multiplex Equipment (SONET ADM) Generic Criteria, Issue 3, May 1992;

Bellcore Transport System Generic Requirements FR-440, Issue No. 98, September 1998; IEEE/ANSI 802.3 Ethernet LAN specification; and Networking Standards, by William Stallings, published by Addison-Wesley Publishing Company (New York, 1993).

A master architecture of a flexible cross-connect system is defined in co-pending U.S. application Ser. No. 09/274,078 filed entitled "Flexible Cross-Connect with Data Plane" filed on Mar. 22, 1999. The basic software architecture of the flexible cross-connect system is disclosed in co-pending U.S. application Ser. No. 09/533,421 entitled "Method and Apparatus for Controlling the Operation of a Flexible Cross-Connect System" filed on Mar. 22, 2000. The basic timing operations of the flexible cross-connect system are disclosed in co-pending U.S. application Ser. No. 09/532,611 entitled "Method and Apparatus for Routing Telecommunication Signals" filed on Mar. 22, 2000. U.S. application Ser. Nos. 09/274,078, 09/533,421 and 09/532,611 are herein incorporated by reference in their entirety but are not admitted to be prior art.

FIG. 1 illustrates a block diagram of a flexible cross-connect system 10, hereinafter referred to as a Network Element (NE) 10, capable of routing traffic across two high-bandwidth planes. The NE 10 includes a telecommunication plane 100, such as a SONET plane, and a data plane 110. The telecommunication plane 100 includes telecommunication plane network interface subsystems 130, and the data plane 110 includes data plane network interface subsystems 140. A centralized fully non-blocking cross-connect unit (XC) 120 is located in the telecommunication plane 100, which interfaces with the telecommunication plane network interface subsystems 130 and the data plane network interface subsystems 140.

Standardized telecommunication traffic, such as SONET, Synchronous Digital Hierarchy (SDH), Pleisochronous Digital Hierarchy (PDH), or other Time Division Multiplexed (TDM) or Wavelength Division Multiplexed (WDM) traffic, enters the system through the telecommunication plane network interface subsystems 130, such as electrical or optical interface subsystems. The telecommunication traffic is transmitted from the telecommunication plane network interface subsystems 130 over point-to-point connections 150 to the XC 120. The XC 120 processes the telecommunication traffic and then transmits the processed data back to a telecommunication network, such as a Wide Area Network (WAN), or transmits the processed data to a data network, such as a Metropolitan or Local Area Network (MAN/LAN). The processed data is transmitted to the telecommunication network via the telecommunication plane network subsystem(s) 130, and to the data network via the data plane network interface subsystem(s) 140.

Standardized telecommunication signals include, but are not limited to, DS-1 (1.5 Mb/s), B-ISDN (1.5 Mb/s) DS-2 (6.3 Mb/s), DS-3 (44.7 Mb/s), CEPT-1 (2.048 Mb/s), CEPT-2 (8.45 Mb/s), CEPT-3 (34.37 Mb/s), CEPT-4 (139.3 Mb/s), electrical STS-1 and its multiples, electrical STM-1 and its multiples, and optical OC-1 and its multiples. Other standardized and non-standardized transmission signal formats can be supported and are understood by those skilled in the art.

Standardized data traffic, such as Ethernet, enters the system through the data plane network interface subsystems 140, such as electrical or optical interface subsystems. The data plane network interface subsystems 140 communicate with the XC 120 via point-to-point connections 150. The data plane 110 also allows for communications between data plane network interface subsystems 140 via point-to-point connectors 160. Thus, the data traffic can be processed by multiple data plane interface subsystems 140 before being transmitted to the XC 120 or back to the data network. As with the telecommunication traffic, the XC 120 processes the data traffic and transmits the processed data to a telecommunication network or a data network.

Standardized data signals include, but are not limited to, packet data transport formats such as Frame Relay, Asynchronous Transfer Mode (ATM), and Integrated Services Digital Network (ISDN); and MAN/LAN formats such as Ethernet, Fiber Distributed Data Interface (FDDI), and Token Ring. The interfaces supported by the data plane network interface subsystems 140 include electrical Ethernet interfaces such as 10BaseT, 100BaseT, and 1000BaseT as well as optical interfaces such as Gigabit Ethernet and OC-12 Packet-over-SONET (POS). Other data-centric interfaces can be used and are understood by those skilled in the art.

In one embodiment, the point-to-point connections 150 between the XC 120 and the telecommunication plane network interface subsystems 130 or between the XC 120 and the data plane network interface subsystems 140 are all in a single specified format. For example, in a preferred embodiment, all the point-to-point connections 150 are high-speed connections realized as Synchronous Transfer Signal (STS)-192 formatted signals. The STS-192 signals are transported on a multi-trace electrical bus formed on a high-speed backplane.

Figure 2:
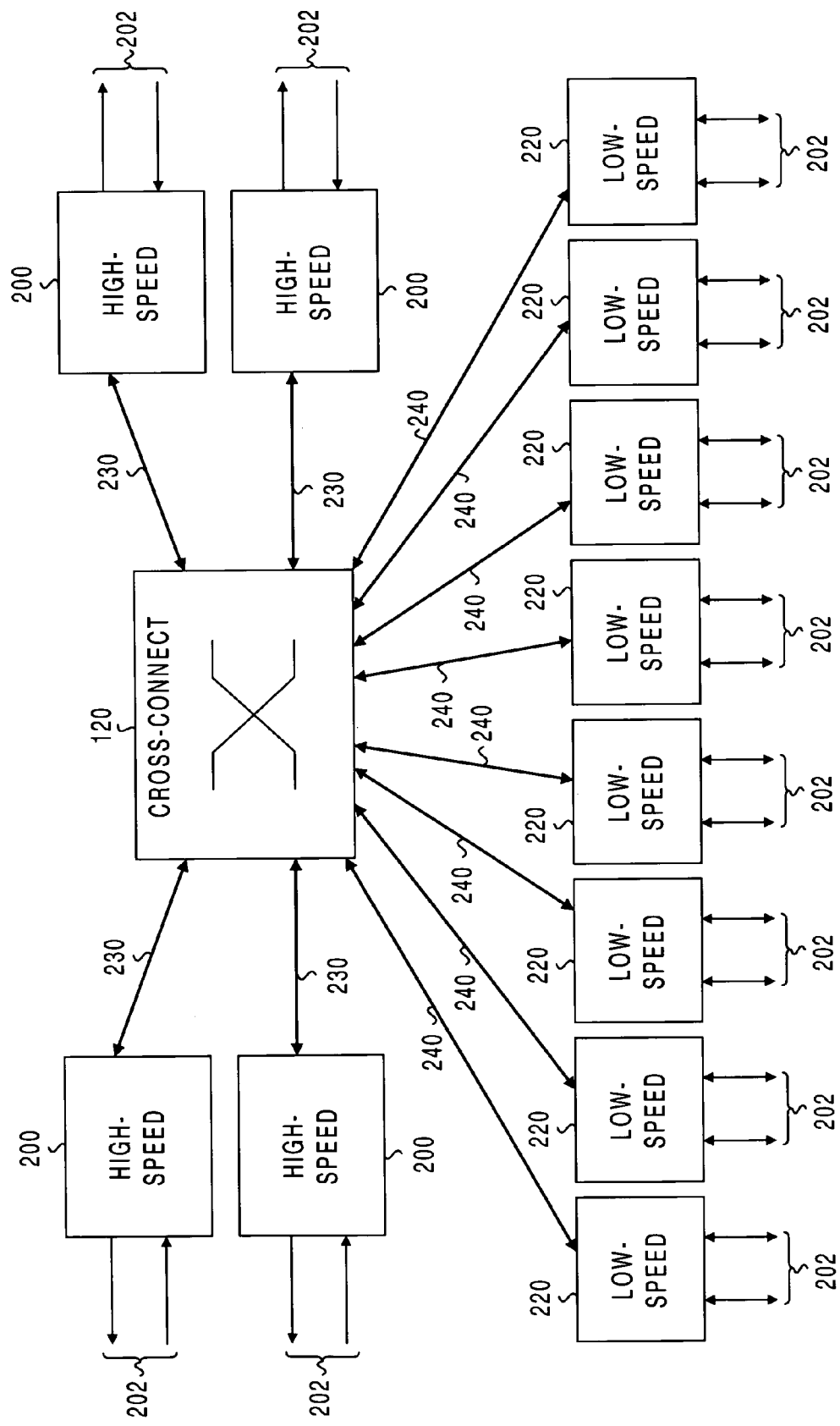
FIG. 2 illustrates a functional diagram of the flexible cross-connect system, according to one embodiment.

In an alternative embodiment, as illustrated in FIG. 2, specific network interface subsystems are designated as high-speed interface subsystems 200 and others are designated as low-speed interface subsystems 220 having corresponding high-speed connections 230 and low-speed connections 240 to the XC 120. For example, the low-speed interconnections 240 may operate at the STS-48 rate of 2.488 Gb/s, while the high-speed interconnections 230 may operate at the STS-192 rate of 9.953 Gb/s.

The high speed network interface subsystems 200 may be realized as printed circuit boards containing active and passive electrical and optical components, and may contain multiple network interfaces 202 operating at the same or different speeds. The low speed network interface subsystems 220 may also be realized as printed circuit boards with active and passive electrical and optical components, and can contain multiple network interfaces 202 operating at the same or different speeds. As an example, a low speed network interface subsystem 220 can be realized as a DS-1 interface board supporting 14 DS-1 interfaces. Alternatively, a low speed network interface subsystem 220 can be realized as an Ethernet board supporting multiple Ethernet interfaces.

Figure 3:
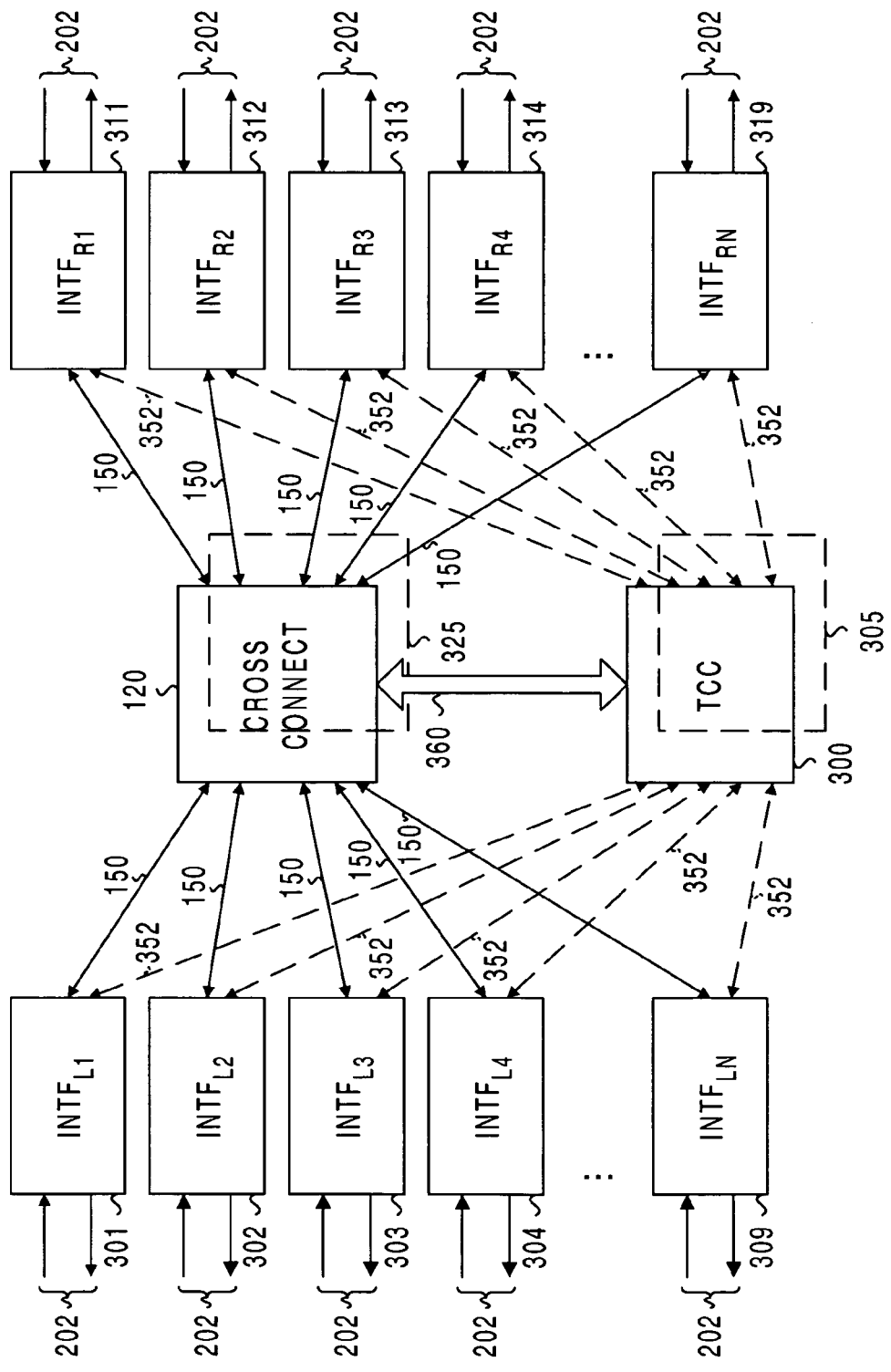
FIG. 3 illustrates communication channels between elements of the flexible cross-connect system, according to one embodiment.

As illustrated in FIG. 3, the XC 120 has direct point-to-point connections 150 with each interface subsystem 301, 302, 303, 304, 309, 311, 312, 313, 314, 319. Each of the interface subsystems 301–304, 309, 311–314, and 319 represents an interface card which is either of the class of cards which are telecommunication plane network interface subsystems 130 (high-speed) or which are data plane network interface subsystems 140 (low-speed). The designation L and R in network interface subsystems 301–304, 309, 311–314, and 319 are used to simply designate left-hand side or right hand-side of a mechanical configuration, but are not intended to be architectural limitations.

Referring to FIG. 3, there are multiple point-to-point System Communication Links (SCLs) 352 between a centralized timing, control, and communications subsystem (TCC) 300 and each of the interface subsystems 301–304, 309, 311–314, and 319. The TCC 300 is also directly connected to the XC 120 via a TCC to XC communication bus 360. In a preferred embodiment, the system has a redundant XC 325 and a redundant TCC 305.

Figure 4A:
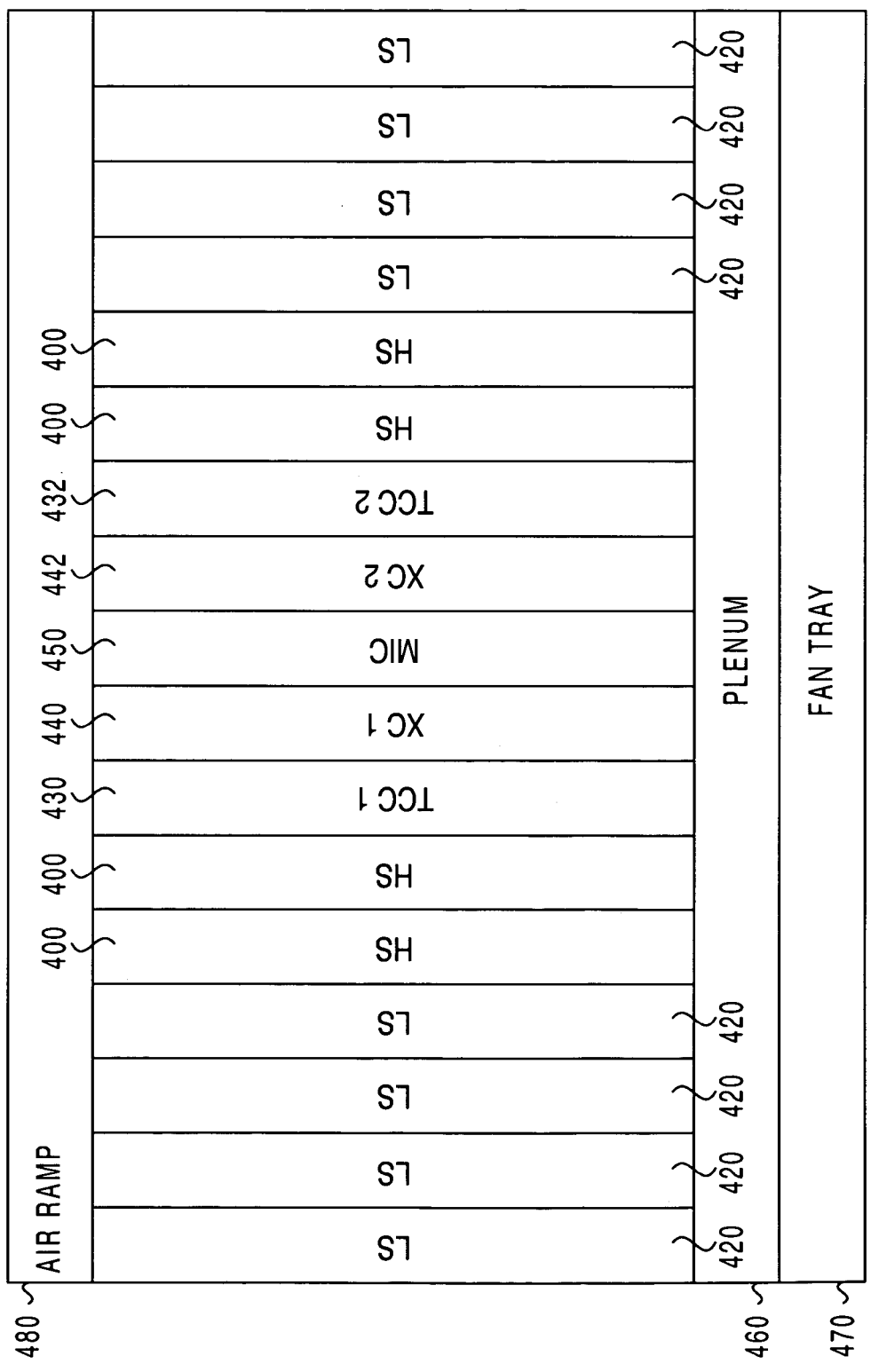
FIGS. 4A and 4B illustrates the mechanical (rack) configuration of the flexible cross-connect system, according to one embodiment.
Figure 4B:
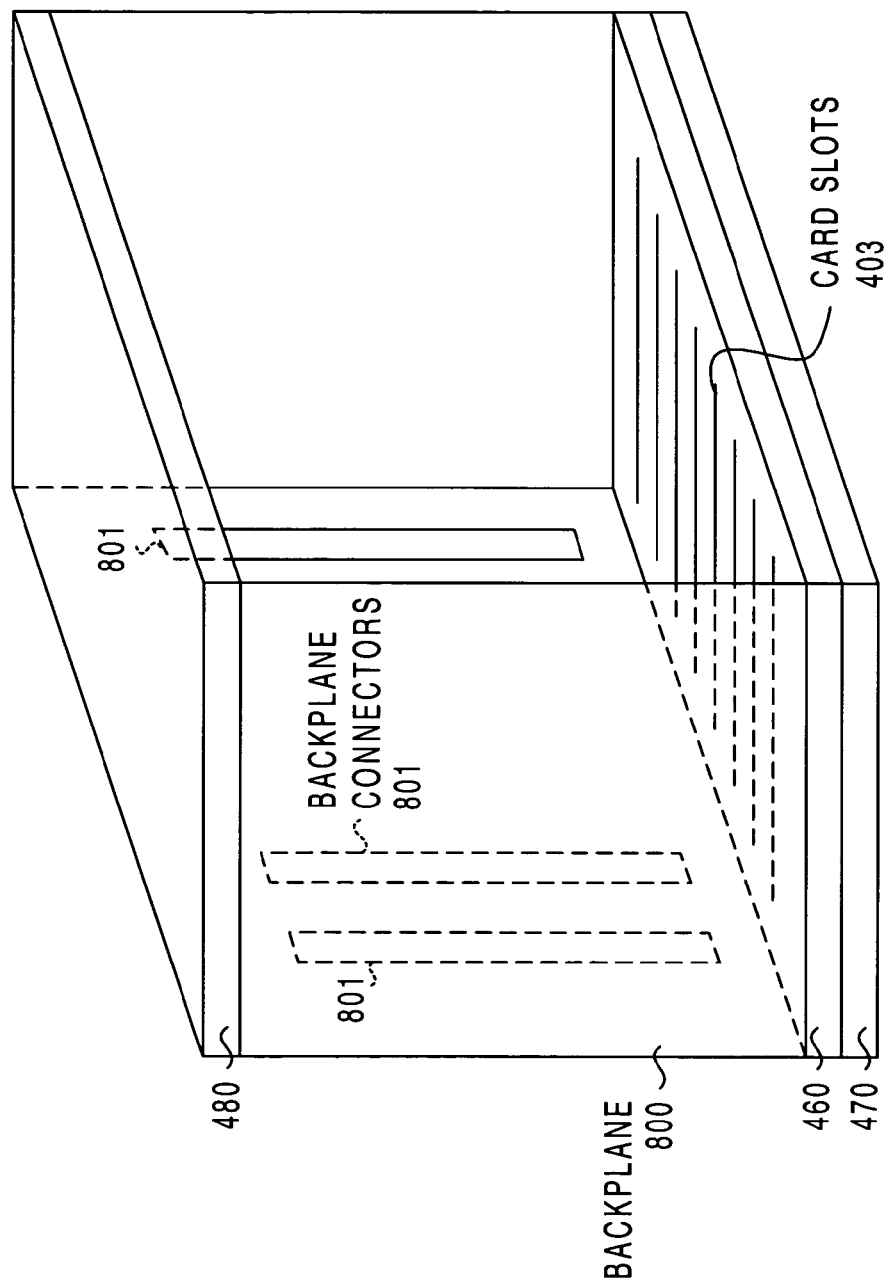

FIGS. 4A and 4B illustrates the NE 10 as a rack 400 with card slots. The rack consists of a card cage, a backplane 800, and set of plug-in cards. Mechanical card guides and backplane connectors 801 on the backplane 800 form card slots 403. As illustrated, the card slots 403 in the card cage are numbered from 1 to 17, left to right. The plug-in cards are grouped into two general groups. The first group is the common equipment cards, which include a XC card 440, a redundant XC card 442, a TCC card 430, a redundant TCC card 432, and a Miscellaneous Interface Card (MIC) 450. The second group is the network interface cards and includes low speed cards 420 and high speed cards 400, which form the telecommunication plane network interface subsystems 130 and the data plane network interface subsystems 140.

As illustrated in FIG. 4A, high-speed network interface cards 400 and low speed network interface cards 420 are supported. In one embodiment, the high speed network interface cards 400 support one or more electrical and optical interfaces up to Optical Carrier (OC)-192 data rates, while the low speed network interface cards 420 support data rates of up to OC-48. Traffic carried through these network interfaces is routed over the backplane 800 to the XC card 440 or the redundant XC card 442.

Figure 5:
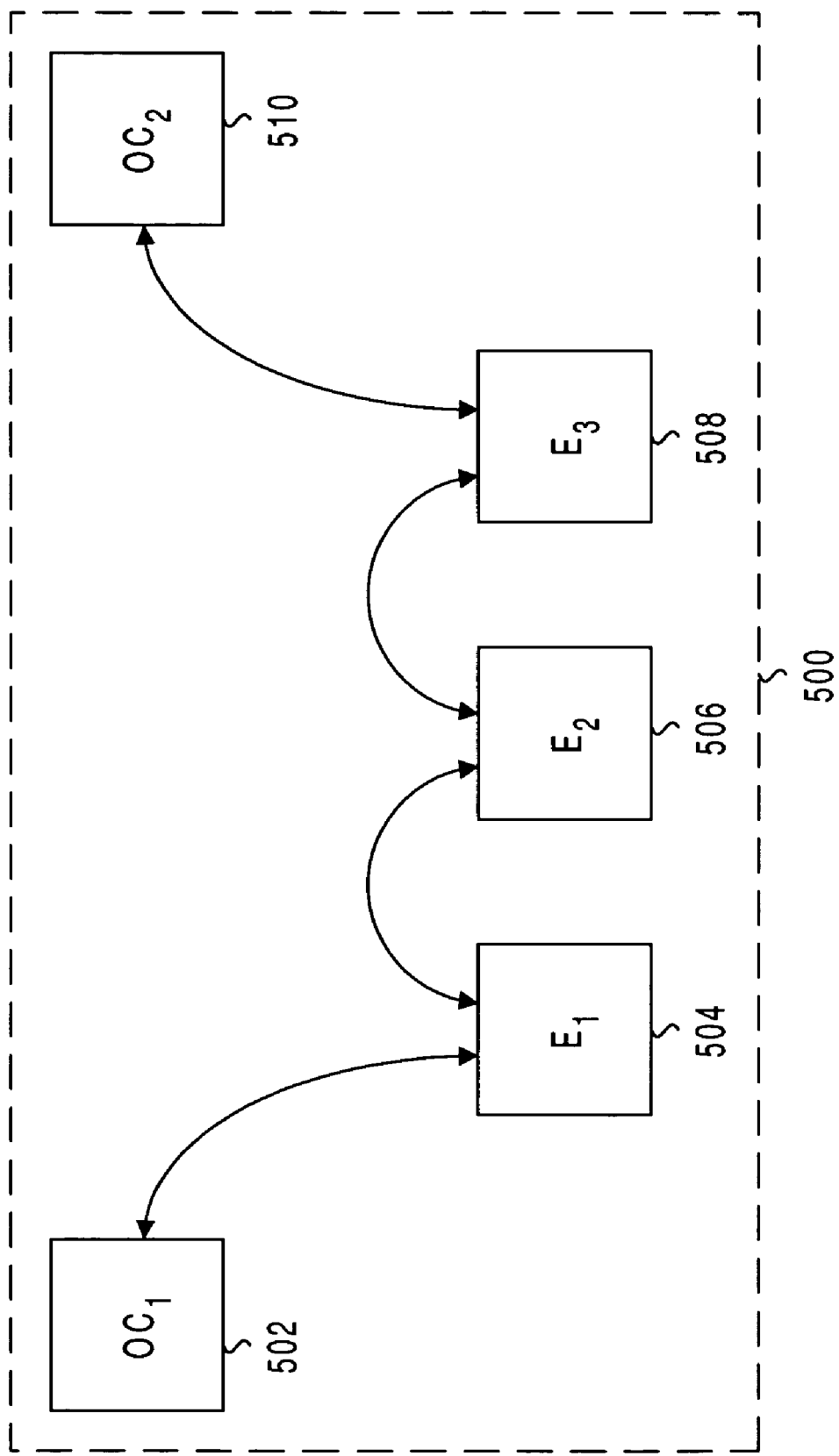
FIG. 5 illustrates a data circuit within the flexible cross-connect system, according to one embodiment.

FIG. 5 illustrates an example data circuit within the NE 10. In this example, the NE 10 is configured as an ADM 500. The data circuit consists of a first high-speed (SONET) card 502, first, second and third low-speed (Ethernet) cards 504, 506, 508, and a second high-speed card 510. As illustrated the data circuit is a Bi-directional Line-Switched Ring (BLSR) circuit, meaning that the data flows in both directions between interface cards. However, as one skilled in the art would recognize the data circuit could also be a Uni-directional Line-Switched Ring (ULSR) circuit, meaning that data flows in only one direction.

Figure 6:
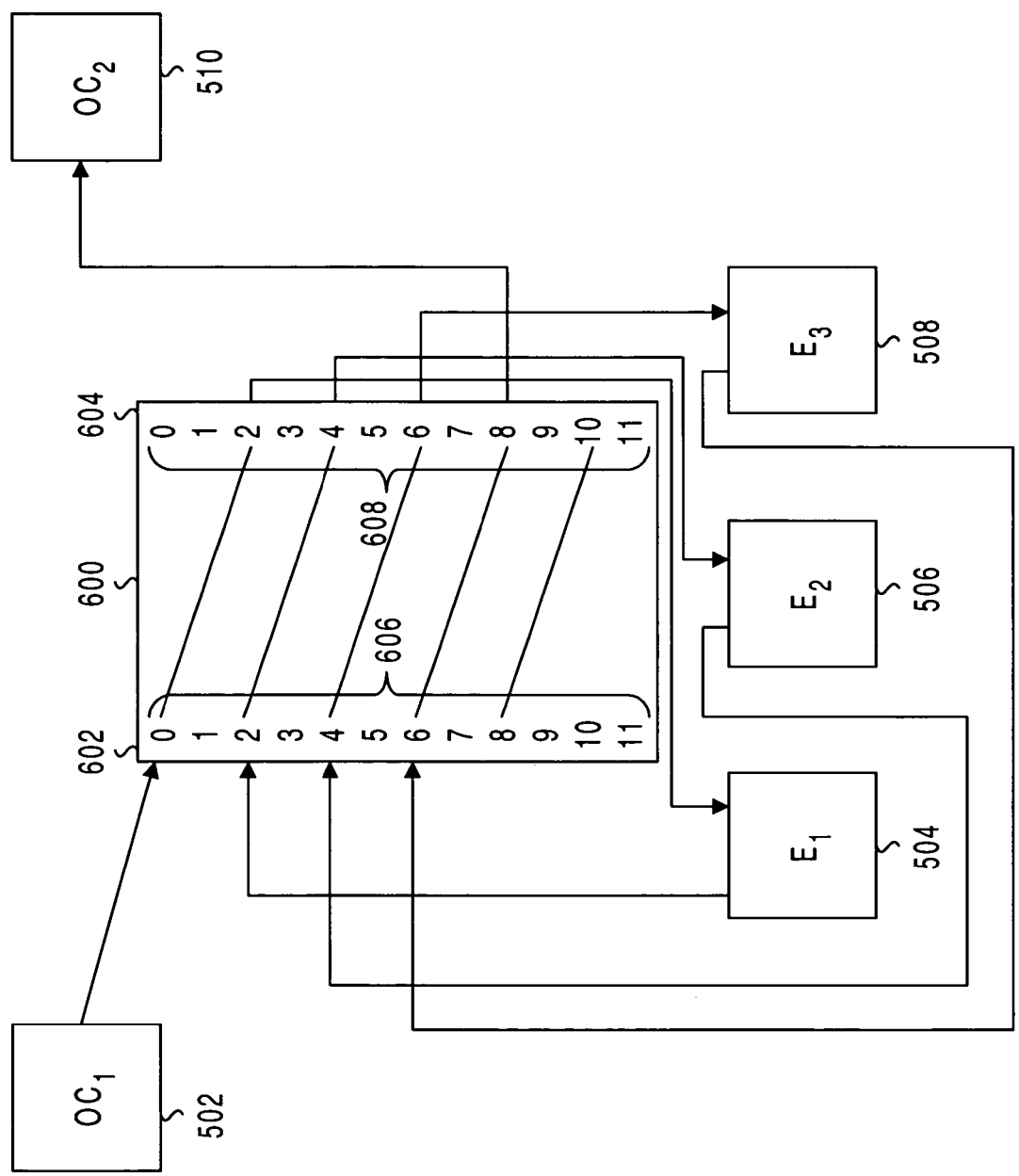
FIG. 6 illustrates the data circuit of FIG. 5 routed through a cross-connect, according to one embodiment.

FIG. 6 illustrates a preferred embodiment of how the data circuit of FIG. 5 would be implemented on the NE 10. However, for simplicity, FIG. 6 illustrates a ULSR circuit. In this embodiment, the connections between each of the interface cards are made through an XC 600. As illustrated the XC 600 has an input side 602 and an output side 604. Both the input side 602 and the output side have an equal number of ports 606, 608. In a preferred embodiment the number of ports 606, 608 is equal to the number of interface cards in the NE 10. Each port 606 is connected to each port 608 so that the XC 600 can be used to connect any interface card to any other interface card. That is, each interface card is stitched to each other interface card. As illustrated, the XC 600 has 12 ports, ports 0–11, corresponding to the interface cards in the NE 10. For ease, the interface cards 502, 504, 506, 508, 510 are illustrated as ports 0, 2, 4, 6, and 8 accordingly.

In order to maintain the data circuit within the NE 10 in the event that one or more of the interface cards within the data circuit become inoperable for any reason, including the interface card being removed, a matrix is established for each data circuit. The matrix includes, for each output of the XC 600 connected to an interface card (destination point), a source point, a next drop point, and a previous point. The source point is the input of the XC600 and the destination for a particular data stream. That is, the XC600 uses the table to route the data stream from the card connected to the input port to the card connected to the output port. The next point is the next card in the data stream that will be receiving data (that is, the next output of the XC600). In the event that the destination point becomes inoperable, the XC 600 stitches the data stream together by transmitting the data stream from the source point to the next drop point. A data circuit that is identified by such a matrix is known as a data stitch circuit because the XC 600 stitches the circuit back together in the event that one or more interface cards within the data circuit are inoperable.

The previous point identifies where the interface card, associated with the source point, received its data. That is, the previous point is the output from the XC600 that was received by the source interface card. The previous point is used when an inoperable card that is part of the data stitch matrix becomes operational. This ensures that the appropriate data stream is forwarded.

Figure 7A:
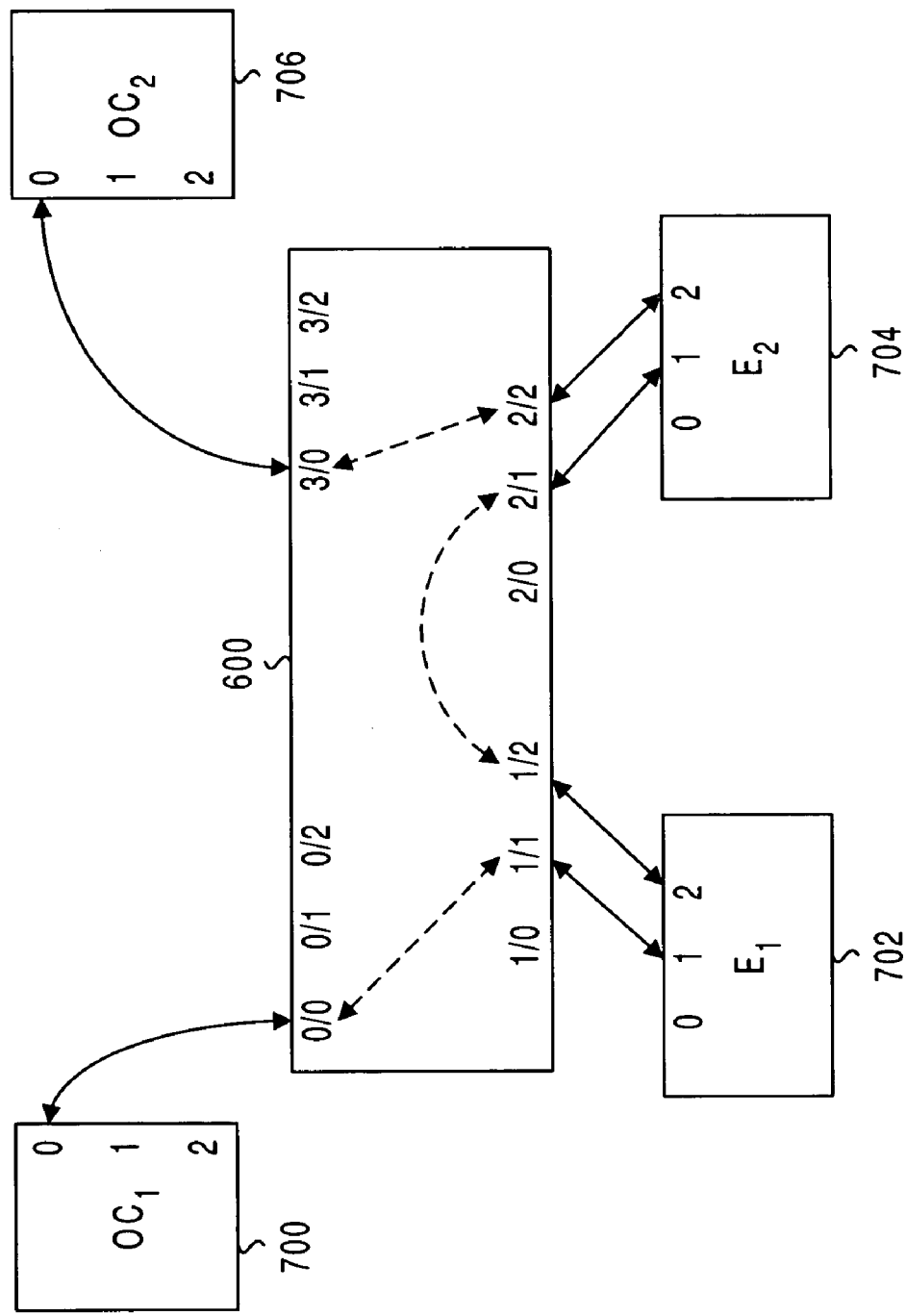
FIGS. 7A–7C illustrate changes in a data circuit, according to one embodiment.

FIG. 7A illustrates a simple NE 10 that only consists of four interface cards. Thus, a data circuit can consist of a maximum of four elements if the data circuit includes each interface card. It should be noted that the NE 10 is in no way limited to four interface cards. As one skilled in the art would recognize, the NE 10 could include any number of interface cards, for example as illustrated in FIG. 4A, the NE 10 could have 12 interface cards.

FIG. 7A illustrates a data circuit that includes a first OC card 700, a first Ethernet card 702, a second Ethernet card 704 and a second OC card 706. The XC 600 for this NE 10 has four sets of input ports and four sets of output ports (labeled 0/x–3/x), each set of ports being associated with an interface card. The /x will be described in detail later. For this example, the first OC card 700 is coupled to a port of port set 0, the first Ethernet card 702 to ports of port set 1, the second Ethernet card 704 to ports of port set 2, and the second OC card 706 to a port of port set 3.

It should be noted that the port sets being illustrated on the top or bottom of the XC 600 are purely for illustration and do not represent input ports or output ports. In fact, the illustrated port sets actually represent both input and output ports in FIG. 7A. As one skilled in the art would know, the input ports and the output ports would be separate and communications to the XC 600 would be received at the input ports and communications from the XC 600 would be transmitted from the output ports.

The NE 10 of FIG. 7A also only supports STS-3 communications. Thus, it is only possible for each card to transmit or receive three different type of data streams. That is, each card would be capable of sending STS-1, 2 or 3 data streams (labeled y/0–y/2, where y is the port). For example, an interface card could send three STS-1 streams, one STS-1 stream and one STS-2 stream, or one STS-3 stream. Since each card would be capable of sending one of three different STS streams it is possible that each card would have three ports, one for each type of stream.

It should be noted that FIG. 7A illustrates an STS-3 system for simplicity and does not limit the scope of the invention to such. It would be understood by one skilled in the art that each interface card could support higher-speed signals, for example an STS-192 signal, and that the XC would have an equivalent number of ports, for example 192.

As illustrated in FIG. 7A, the first OC card 700 transmits the data stream out the STS-1 port (labeled STS 0) to the XC 600 (port 0/0). The XC 600 routes the data stream from input port 0/0 to output port 1/1 and transmits the data stream to the STS-2 port (labeled STS 1) on the first Ethernet card 702. The first Ethernet card 702 transmits the data stream out the STS-3 port (labeled STS 2) to the XC 600 (port 1/2). The XC 600 routes the data stream from input port 1/2 to output port 2/1 and transmits the data stream to the STS-2 port (labeled STS 1) on the second Ethernet card 704. The second Ethernet card 704 transmits the data stream out the STS-3 port (labeled STS 2) to the XC 600 (port 2/2). The XC 600 routes the data stream from input port 2/2 to output port 3/0 and transmits the data stream to the STS-1 port (labeled STS 0) of the second Ethernet card 706. As illustrated, the XC 600 has a port for each card and each potential STS stream of each card.

The table below illustrates a matrix for the simple NE 10 of FIG. 7A. The matrix includes for each port on the XC 600, if applicable, the source port, the previous port and the next port. For example, the first OC card 700 (port 0) is receiving data at its STS-1 port (STS 0) from the STS-2 port (STS 1) of the first Ethernet card 702 (port 1). That is, port 1/STS 1 is the source. The first OC card 700 is the end of the circuit, therefore there is no next port/STS. The first Ethernet card received the data stream at its STS-3 port (STS 2). Thus, port 1/STS 2 is the previous port/STS.

| Port/STS | Source Port/STS | Next Port/STS | Previous Port/STS |
|---|---|---|---|
| 0/0 | 1/1 | N/A | 1/2 |
| 0/1 | N/A | N/A | N/A |
| 0/2 | N/A | N/A | N/A |
| 1/0 | N/A | N/A | N/A |
| 1/1 | 0/0 | 2/1 | N/A |
| 1/2 | 2/1 | 0/0 | 2/2 |
| 2/0 | N/A | N/A | N/A |
| 2/1 | 1/2 | 3/0 | 1/1 |
| 2/2 | 3/0 | 1/2 | N/A |
| 3/0 | 2/2 | N/A | 2/1 |
| 3/1 | N/A | N/A | N/A |
| 3/2 | N/A | N/A | N/A |

Figure 7B:
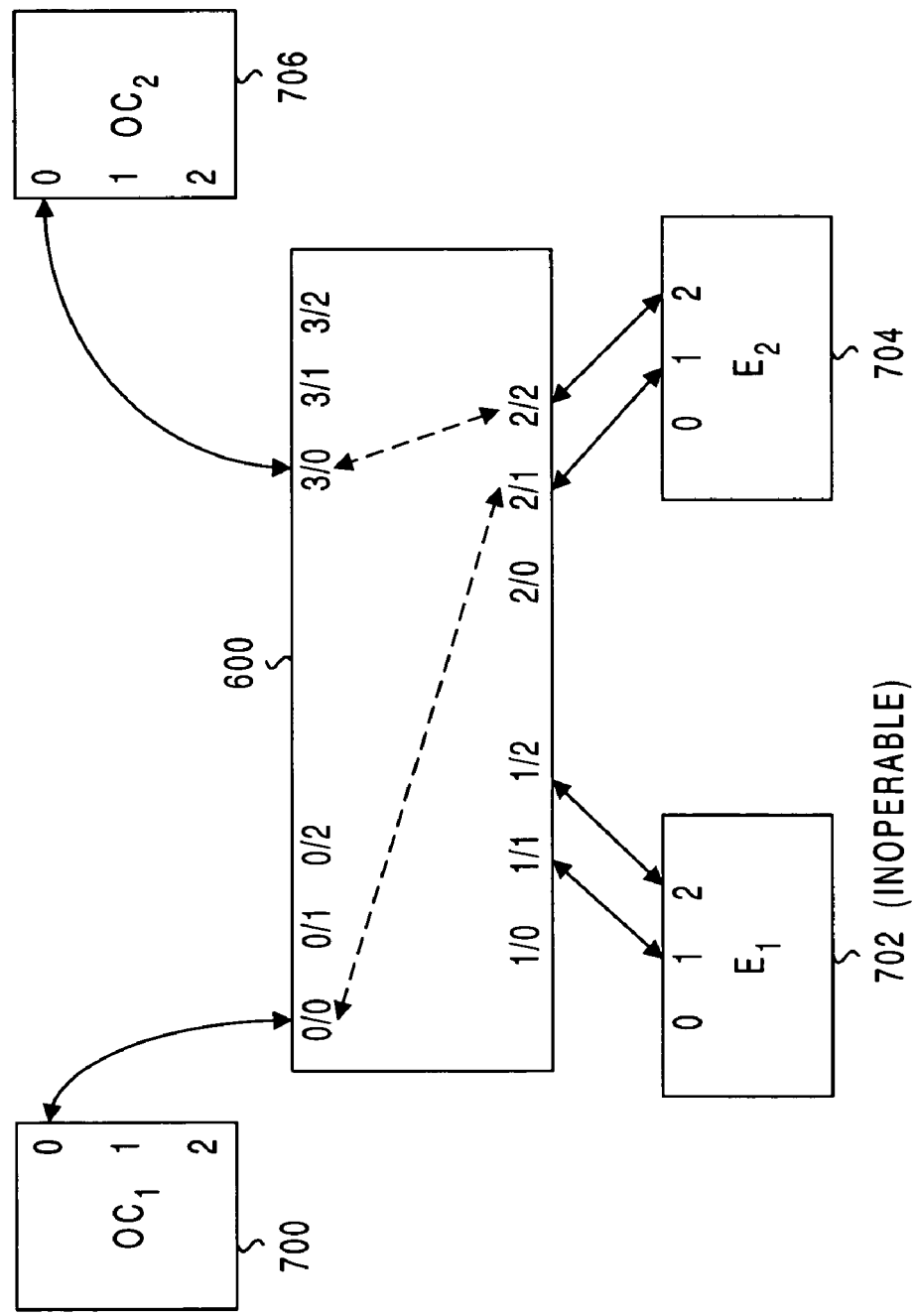

If an Ethernet card, which is part of the data circuit, becomes inoperable (i.e., is removed), the data stream will be routed around the inoperable card by transmitting the data stream from the source point (interface card, which may be and Ethernet card or an OC card depending on the data stitch) to the next drop point (interface card). For example, the data stream from the first OC card 700 would enter the XC 600 at port 0/STS 0. The XC 600 would realize that it can not route the data stream to the first Ethernet card 702 (port 1/STS 1) so it would determine from the matrix that the next location was port 2/STS 1 (the STS-2 port of the second Ethernet card 704) and stitch the data stream to that output accordingly. The rerouting of the data stream in essence stitched the data circuit together in the absence of an element of the data circuit. FIG. 7B illustrates this example.

Figure 7C:
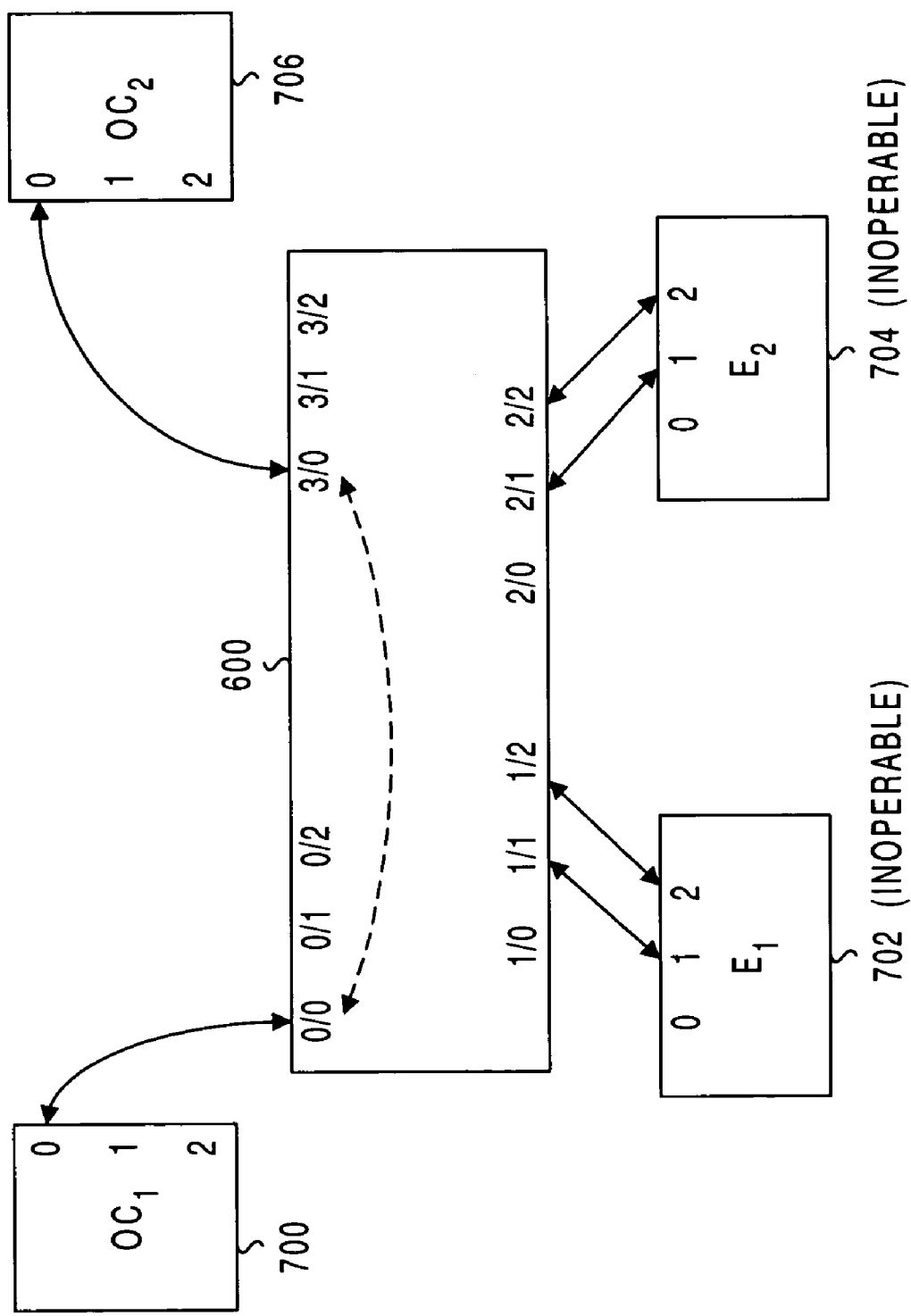

If multiple Ethernet cards become inoperable, the XC 600 will use the data stitch matrix to continually determine what the next point is until one of the next points is available. For example, if both the first and second Ethernet cards 702, 704 became inoperable, the first OC card 700 would end up routing the data stream to the second OC card 706. That is, the data stream would be sent from the first OC card 700 to the XC 600 (port 0/STS 0). The XC 600 would determine that the first Ethernet card 702 associated with the destination port (port 1/STS 1) for that data circuit was inoperable. The XC 600 would use the cross-stitch matrix to determine that the next port was port 2/STS 1 (the second Ethernet card 704). The XC 600 would then determine that the second Ethernet card 704 was inoperable and would use the cross-stitch matrix to determine the next port for port 2/STS 1 was port 3/STS 0 (the second OC card 706). The XC 600 would then route the data stream from the first OC card 700 (port 0/STS 0) to the second OC card 706 (port 3/STS 0). The data stitch matrix enabled the XC 600 to maintain the data circuit even when two Ethernet cards have failed. FIG. 7C illustrates this example.

If a card that was previously inoperable and is part of the data circuit becomes operational, the XC 600 will use the data stitch matrix to stitch the operable card back into the circuit. In order to stitch the data circuit back together, the XC 600 will use the source and destination ports as well as the previous port from the data stitching matrix. For example, if the first Ethernet card 702 in the example depicted in FIG. 7B becomes operational, the XC 600 will know to route data from the second Ethernet card 704 (source, port 2/STS 1) to the first Ethernet card 702 (destination, port 1/STS 2). The XC 600 will also know to route data from the first Ethernet card 702 (source, port 1/STS 1) to the first OC card 700 (destination, port 0/STS 0). The XC 600 will know that the data stream to be routed by the first Ethernet card 702 is the data stream received by the first Ethernet card 702 at port 1/STS 2 by utilizing the previous port column of the data stitch matrix for the first OC card 700 (port 0/STS 0). As one skilled in the art would recognize the same methodology would be followed if multiple interface cards from the data circuit which were inoperable, all become operable again.

In a preferred embodiment, the TCC 300 creates and maintains the data stitch table for each data circuit. The TCC 300 determines when interface cards should be added or removed from the data circuit, and thus added or removed from the data stitching matrix. The functions performed by the TCC 300 can be implemented by a set of computer instructions stored on a computer readable memory. The operation of the TCC 300 with respect to creating and maintaining the data stitch table is defined in Applicants co-pending application entitled "Method and Apparatus for Automatically Provisioning Data Circuits" filed on the same day as this application and having 09/625,662. 09/625,662 is herein incorporated by reference but is not admitted to be prior art.

The present system can be utilized in a variety of configurations supporting transport of data on MAN/LAN, interLATA and interexchange networks. Because the system can establish cross connections between any interface cards and can use a data plane 140 for local switching, a wide variety of transport configurations can be supported, including configurations in which a virtual LAN is created in the data plane 140, and access to the telecommunication plane 130 is granted for transport to other nodes.

Although this invention has been illustrated by reference to specific embodiments, it will be apparent to those skilled in the art that various changes and modifications may be made, which clearly fall within the scope of the invention. The invention is intended to be protected broadly within the spirit and scope of the appended claims.

What is claimed is:

1. An apparatus for maintaining a data circuit in the event that one or more devices within the data circuit become inoperable, the apparatus comprising:
   a plurality of interface cards for transmitting and receiving data streams;
   a cross-connect unit for routing the data streams received from a first set of said plurality of interface cards to a second set of said plurality of interface cards, said cross-connect unit routing each data stream based on an associated matrix, wherein the associated matrix identifies the interface cards that will receive the data stream and an order that the interface cards will receive the data stream;
   a control unit for controlling the operation of the apparatus; and
   a backplane forming connections between the cross-connect unit and each of the plurality of interface cards.

2. The apparatus of claim 1, wherein the associated matrix includes a source point and a destination point for each section of the data circuit, wherein a section is defined as a transmission of the data stream from one interface card to another interface card, the source point corresponds to a transmitting interface card and the destination point corresponds to a receiving interface card.

3. The apparatus of claim 2, wherein the associated matrix further includes a next drop point for each destination point so that said cross-connect unit can route the data stream to the next drop point if the receiving interface card associated with the destination point is inoperable.

4. The apparatus of claim 3, wherein in the event that consecutive interface cards are inoperable said cross-connect unit can continually utilize the next drop point in the associated matrix to determine the next interface card to receive the data stream.

5. The apparatus of claim 2, wherein the associated matrix further includes a previous point for each source point.

6. The apparatus of claim 5, wherein the previous point is used to incorporate an interface card that is defined as part of the data circuit and that was previously inoperable back into the data circuit when the interface card becomes operational.

7. The apparatus of claim 1, wherein each of said plurality of interface cards is connected to all other of said plurality of interface cards through said cross connect unit.

8. The apparatus of claim 1, wherein the apparatus is an Ethernet switch.

9. The apparatus of claim 1, wherein the apparatus is an add-drop multiplexer.

10. The apparatus of claim 1, wherein said plurality of interface cards include telecommunication cards.

11. The apparatus of claim 10, wherein said telecommunication cards include Wavelength Division Multiplexed (WDM) and Time Division Multiplexed (TDM) cards.

12. The apparatus of claim 10, wherein the telecommunication cards include SONET, SDH and PDH cards.

13. The apparatus of claim 1, wherein said plurality of interface cards include a SONET card.

14. The apparatus of claim 13, wherein said data cards include Ethernet, Token Ring and FDDI cards.

15. The apparatus of claim 1, wherein said plurality of interface cards include a first telecommunications card, a data card, and a second telecommunications card.

16. The apparatus of claim 15, wherein the first and the second telecommunications cards are SONET cards.

17. The apparatus of claim 15, wherein the data card is at least one Ethernet card.

18. The apparatus of claim 17, wherein the data circuit will be maintained if any or all of the Ethernet cards become inoperable.

19. The apparatus of claim 1, wherein said cross connect unit is passive.

20. The apparatus of claim 1, wherein said cross-connect unit determines when an interface card is inoperable and utilizes the associated matrix to determine where to route the data stream.

21. An apparatus for flexibly routing a data stream around an inoperable interface card, the apparatus comprising:
a plurality of interface cards for transmitting and receiving data streams, wherein each interface card within a set of interface cards are receiving the data stream, the set of interface cards defining a data circuit;
a cross-connect unit for routing dab streams between the plurality of interface cards;
a control twit for controlling the operation of the apparatus;
a backplane for connecting the plurality of interface cards to said cross-connect unit; and
a database containing a matrix for the data circuit that identifies the order that the data stream will be routed to the set of interface cards, for each interface card the matrix includes a destination point and a next destination point,
wherein said cross-connect unit utilizes the matrix to determine how to route the data stream, said cross-connect unit automatically routes the data stream to the next destination point when an interface card associated with the destination point becomes inoperable.

22. An apparatus for flexibly routing a data stream directly from a first interface card to a third interface card, when a second interface card that was supposed to receive the data stream from the first interface card and transmit the data stream to the third interface card becomes inoperable, the apparatus comprising:
a plurality of interface cards for transmitting and receiving data streams;
a cross-connect unit for routing data streams between the plurality of interface cards;
a control unit for controlling the operation of the apparatus;
a backplane for connecting the plurality of interface cards to said cross-connect unit; and
a database containing a matrix that directs where said cross-connect unit routes the data stream, the matrix includes a first destination and a second destination for each interface card, so that when the second interface card fails, the matrix directs said cross-connect unit to route the data stream from the first interface card to the third interface card.

23. A method for maintaining a data circuit in the event that one or more devices within the data circuit become inoperable, the method comprising:
defining the data circuit as a plurality of interface cards that will receive a particular data stream;
generating a matrix based on the data circuit, including a destination point and a next destination point for each interface card; and
routing the data stream to the appropriate interface cards, wherein a cross-connect unit routes the data stream to the destination point identified in the matrix, and if the interface card associated with the destination point is inoperable to the next destination point identified in the matrix.

24. The method of claim 23, further comprising continually utilizing the next destination point in the matrix to determining the next interface card for the cross-connect unit to route the data stream to in event that consecutive interface cards in the data circuit are inoperable.

25. The method of claim 23, wherein said generating a matrix includes generating a matrix that includes a destination point, a next destination point, and a previous point for each interface card.

26. The method of claim 25, further comprising utilizing the previous point to incorporate an interface card that is defined as part of the data circuit and that was previously inoperable back into the data circuit when the interface card becomes operational.

27. The method of claim 23, wherein the data circuit includes SONET cards.

28. The method of claim 23, wherein the data circuit includes Ethernet cards.

29. A method for flexibly routing a data stream around an inoperable interface card, the method comprising:
defining a data circuit as a plurality of interface cards receiving the data stream;
utilizing a cross-connect unit to route the data stream between the plurality of interface cards; and controlling the operation of the cross-connect unit with a matrix, the matrix identifying the order that the data strewn will be routed to the data circuit including a destination point and a next destination point for each interface card so that the cross-connect unit automatically routes the data stream to the next destination point when an interface card associated with the destination point becomes inoperable.

30. A method for flexibly transmitting a data stream directly from a first interface card to a third interface card when a second interface card which was planned to receive the data stream from the first interface card and transmit the data stream to the third interface card is rendered inoperable, the method comprising:
generating a matrix that identifies interface cards to receive the data stream, the matrix including destination points and next destination points for each interface card;
receiving the data stream at the first interface card;
transmitting the data stream from the first interface card to a cross-connect unit;
determining from the matrix that the cross-connect unit should route the data stream to the second interface card;
determining that the second interface card is inoperable;
determining from the matrix that since the second interface card is inoperable the cross-connect unit should route the data stream to the third interface card; and
transmitting the data stream from the cross-connect unit to the third interface card.

31. The method of claim 30, wherein the first, the second and the third interface cards are located within a network element.

32. A computer program embodied on a computer readable memory for maintaining a data circuit in the event that one or more devices within the data circuit become inoperable, the computer program comprising:
a code segment for defining the data circuit as a plurality of interface cards that will receive a particular data stream;
a code segment for generating a matrix based on the data circuit, the matrix including a destination point and a next destination point for each interface card; and
a code segment for routing the data stream to the appropriate interface cards, wherein the data stream is routed to the destination point identified in the matrix, and if the interface card associated with the destination point is inoperable the data stream is routed to the next destination point identified in the matrix.

33. The computer program of claim 32, further comprising a code segment for continually utilizing the next destination point in the matrix to determine the next interface card to route the data stream to in event that consecutive interface cards in the data circuit are inoperable.

34. The computer program of claim 32, wherein said code segment for generating a matrix generates a matrix that also includes a previous point for each interface card.

35. The computer program of claim 34, further comprising a code segment for utilizing the previous point to incorporate an interface card that is defined as part of the data circuit and that was previously inoperable back into the data circuit when the interface card becomes operational.

36. A computer program embodied on a computer readable memory for flexibly routing a data stream around an inoperable interface card, the computer program comprising:
a code segment for defining a data circuit as a plurality of interface cards receiving the data stream;
a code segment for utilizing a cross-connect unit to route the data stream between the plurality of interface cards;
a code segment for controlling the operation of the cross-connect unit with a matrix, the matrix identifying the order that the data stream will be routed to the data circuit including a destination point and a next destination point for each interface card so that the cross-connect unit automatically routes the data stream to the next destination point when an interface card associated with the destination point becomes inoperable.

37. A computer program embodied on a computer readable memory for flexibly transmitting a data stream directly from a first interface card to a third interface card when a second interface card which was planned to receive the data stream from the first interface card and transmit the data stream to the third interface card is rendered inoperable, the computer program comprising:
a code segment for generating a matrix that identifies interface cards to receive the data stream, the matrix including destination points and next destination points for each interface card;
a code segment for receiving the data stream at the first interface card;
a code segment for transmitting the data stream from the first interface card to a cross-connect unit;
a code segment for determining from the matrix that the cross-connect unit should route the data stream to the second interface card;
a code segment for determining that the second interface card is inoperable;
a code segment for determining from the matrix that the cross-connect unit should route the data stream to the third interfere card; and
a code segment for transmitting the data stream from the j cross-connect unit to the third interface card.

38. The computer program of claim 37, wherein the first, the second and the third interface cards are located within a network element.

39. An Ethernet switch capable of stream if an Ethernet card within the Ethernet switch becomes inoperable, the Ethernet switch comprising:
a plurality of Ethernet cards for transmitting and receiving data streams;
a cross-connect unit for routing the data streams between said plurality of Ethernet cards; and
memory containing a stitching matrix for each port on said cross-connect unit, wherein the stitching matrix identifies a next location to transmit the data stream in the event that a receiving Ethernet card is rendered inoperable.

40. In a network element containing multiple interface cards which are interconnected through a cross-connect, a method of seamlessly maintaining connectivity between remaining interface cards, when one or more of said interface cards is disconnected from the cross-connect, the method comprising:
defining a circuit mapping table which includes information relating how said interface cards are connected together through the cross-connect;
detecting when one or more of said interface cards is disconnected from the cross-connect; and
connecting the remaining interface cards together through the cross-connect, the connections between the remaining interface cards based on information contained in the circuit table, wherein at least a first one of the remaining interface cards was connected to at least a second one of the remaining interface cards through the one or more disconnected cards prior to the one or more interface cards becoming disconnected from the cross-connect.

41. The method of claim 40, wherein said interface cards include one or more Ethernet cards.

42. In a network element containing multiple interface cards which are interconnected through a cross-connect unit, a computer program embodied on a computer readable medium for seamlessly maintaining connectivity between remaining interface cards, when one or more of said interface cards is disconnected from the cross-connect unit, the computer program comprising:
- a source code segment for defining a circuit mapping table which includes information relating to how said interface cards are connected together through the cross-connect unit;
- a source code segment for detecting when one or more of said interface cards is disconnected from the cross-connect unit; and
- a source code segment for connecting the remaining interface cards together through the cross-connect unit, the connections between the remaining interface cards based on information contained in the circuit table, wherein at least a first one of the remaining interface cards was connected to at least a second one of the remaining interface cards through the one or more disconnected cards prior to the one or more interface cards becoming disconnected from the cross-connect.

43. A method of establishing a virtual intelligent backplane, the method comprising:
- connecting a plurality of interface cards to each other through a cross connect, wherein the manner in which the interface cards are connected defines a data circuit;
- establishing a mapping table for the data circuit, the mapping table including direct connections for each interface card and next connections for each interface card;
- determining that a first interface card that is connected to a second interface card and a third interface card is inoperable; and
- connecting the second interface card to the third interface card, when the mapping table defines the third interface card as the next connection for the second interface card.

44. A computer program embodied on a computer readable medium for establishing a virtual intelligent backplane, the computer program comprising:
- a source code segment for connecting a plurality of interface cards to each other through a cross-connect, wherein
- the manner in, which the interface cards are connected defines a data circuit;
- a source code segment for establishing a mapping table for the data circuit, the mapping table including direct connections for each interface card and next connections for each interface card;
- a source code segment for determining that a first interface card that is connected to a second interface card and a third interface card is inoperable; and
- a source code segment for connecting the second interface card to the third interface card, when the mapping table defines the third interface card as the next connection for the second interface card.

45. A computer program embodied on a computer readable memory for maintaining a data circuit in the event that one or more devices within the data circuit become inoperable, the computer program comprising:
- a code segment for defining the data circuit as a plurality of interface cards that will receive a particular data stream;
- a code segment for generating a matrix based on the data circuit, the matrix including a destination point and a next destination point for each interface card; and
- a code segment for routing the data stream to the appropriate interface cards, wherein the data stream is routed to the destination point identified in the matrix, and if the interface card associated with the destination point is inoperable the data stream is routed to the next destination point identified in the matrix.

46. An apparatus for maintaining a data circuit in the event that one or more devices within the data circuit become inoperable, the apparatus comprising:
- means for defining, the data circuit as a plurality of interface cards that will receive a particular data stream;
- means for generating a matrix based on the data circuit, the matrix including a destination point and a next destination point for cacti interface card; and
- means for routing the data stream to the appropriate interface cards, wherein the data stream is routed to the destination point identified in the matrix, and if the interface card associated with the destination point is inoperable the data stream is routed to the next destination point identified in the matrix.

47. The apparatus of claim 46, further comprising means for continually utilizing the next destination point in the matrix to determine the next interface card to route the data stream to in event that consecutive interface cards in the data circuit are inoperable.

48. The apparatus of claim 46 wherein said means for generating a matrix generates a matrix that also includes a previous point for each interface card.

49. The apparatus of claim 48, further comprising means for utilizing the previous point to incorporate an interface card that is defined as part of the data circuit and that was previously inoperable back into the data circuit when the interface card becomes operational.

50. An apparatus for flexibly routing a data stream around an inoperable interface card, the apparatus comprising:
- means for defining a data circuit as a plurality of interface cards receiving the data stream;
- means for utilizing a cross-connect unit to route the data stream between the plurality of interface cards; and
- means for controlling the operation of the cross-connect unit with a matrix, the matrix identifying the order that the data stream will be routed to the data circuit including a destination point and a next destination point for each interface card so that the cross-connect unit automatically routes the data stream to the next destination point when an interface card associated with the destination point becomes inoperable.

51. An apparatus for flexibly transmitting a data stream directly from a first interface card to a third interface card when a second interface card which was planned to receive the data stream from the first interface card and transmit the data stream to the third interface card is rendered inoperable, the apparatus comprising:

means for generating a matrix that identifies interface cards to receive the data stream, the matrix including destination points and next destination points for each interface card;

means for receiving the data stream at the first interface card;

means for transmitting the data stream from the first interface card to a cross-connect unit;

means for determining from the matrix that the cross-connect unit should route the data stream to the second interface card;

means for determining that the second interface card is inoperable;

means for determining from the matrix that the cross-connect unit should route the data stream to the third interface card; and means for transmitting the data stream from the cross-connect unit to the third interface card.

52. The apparatus of claim 51, wherein the first, the second and the third interface cards are located within a network element.

* * * * *